US006759081B2

(12) United States Patent
Huganen et al.

(10) Patent No.: US 6,759,081 B2
(45) Date of Patent: Jul. 6, 2004

(54) METHOD OF DEPOSITING THIN FILMS FOR MAGNETIC HEADS

(75) Inventors: Juha Huganen, Lappeenranta (FI); Tapio Kanniainen, Berikon (CH)

(73) Assignee: ASM International, N.V. (NL)

( * ) Notice: Subject to any disclaimer, the term of this patent is extended or adjusted under 35 U.S.C. 154(b) by 60 days.

(21) Appl. No.: 10/136,095

(22) Filed: Apr. 30, 2002

(65) Prior Publication Data

US 2002/0196591 A1 Dec. 26, 2002

Related U.S. Application Data

(60) Provisional application No. 60/290,503, filed on May 11, 2001.

(51) Int. Cl.$^7$ ................................................ B05D 5/12
(52) U.S. Cl. ...................... 427/58; 29/603.07; 360/324; 427/123; 427/126.4; 427/126.6; 427/127; 427/128; 427/129; 427/130; 427/131; 427/132; 427/250; 427/253; 427/255.7; 427/294; 427/314; 427/404; 427/419.3
(58) Field of Search ............................. 427/123, 126.4, 427/126.6, 127–132, 250, 253, 255.7, 294, 314, 404, 419.3; 29/603.07; 360/324

(56) References Cited

U.S. PATENT DOCUMENTS

| 4,058,430 | A | 11/1977 | Suntola et al. ............... 156/611 |
| 5,711,811 | A | 1/1998 | Suntola et al. ............... 118/711 |
| 5,780,175 | A | 7/1998 | Chen et al. |
| 5,916,365 | A | 6/1999 | Sherman ...................... 117/92 |
| 5,939,334 | A | 8/1999 | Nguyen et al. |
| 5,998,048 | A | 12/1999 | Jin et al. |
| 6,006,763 | A | 12/1999 | Mori et al. |
| 6,128,160 | A | 10/2000 | Yamamoto ................. 360/113 |
| 6,143,658 | A | 11/2000 | Donnelly, Jr. et al. |
| 6,144,060 | A | 11/2000 | Park et al. |
| 6,153,062 | A | 11/2000 | Saito et al. ............... 204/192.2 |
| 6,342,277 | B1 | 1/2002 | Sherman ..................... 427/562 |
| 6,404,191 | B2 | 6/2002 | Daughton et al. |
| 6,478,931 | B1 | 11/2002 | Wadley et al. |
| 6,551,399 | B1 | 4/2003 | Sneh et al. |
| 6,617,173 | B1 | 9/2003 | Sneh |

FOREIGN PATENT DOCUMENTS

| JP | 62221102 | 9/1987 |
| WO | WO 00/38191 | 6/2000 |
| WO | WO 02/09126 A2 | 7/2001 |
| WO | WO 02/09158 A2 | 7/2001 |
| WO | WO 01/88972 A1 | 11/2001 |

OTHER PUBLICATIONS

XP–002223616, 5$^{th}$ Asian Symposium on Information Storage Technology (ASIST), Hong Kong, China, Nov. 14–16, 2000.

Ritala et al., "Atomic layer epitaxy –a valuable tool for nanotechnology?," *Nanotechnology*, vol. 10, pp. 19–24, (1999) (no month avail.).

(List continued on next page.)

*Primary Examiner*—Bernard Pianalto
(74) *Attorney, Agent, or Firm*—Knobbe, Martens, Olson & Bear LLP.

(57) ABSTRACT

A structure and method of fabricating a magnetic read head, comprises forming a fill layer for a magnetic read head gap using atomic layer deposition (ALD). The fill layer comprises an insulator, preferably aluminum oxide, aluminum nitride, mixtures thereof and layered structures thereof. Materials having higher thermal conductivity than aluminum oxide, such as berylium oxide and boron nitride, can also be employed in layers within an aluminum oxide structure. The thickness of the ALD-formed head gap fill layer is between approximately 5 nm and 100 nm, preferably between approximately 10 nm and 40 nm.

16 Claims, 1 Drawing Sheet

OTHER PUBLICATIONS

Ueno et al., "Cleaning of $CHF_3$ plasma–etched $SiO_2$/SiN/Cu via structures using a hydrogen plasma, an oxygen plasma, and hexafluoroacetylacetone vapors," *J. Vac. Sci. Technology B*, vol. 16, No. 6, pp. 2986–2995, (Nov./Dec. 1998).

Utriainen et al., "Studies of metallic film growth in an atomic layer epitaxy reactor using $M(acac)_2$ (M = Ni, Cu, Pt) precursors," Applied Surface Science, vol. 157, pp. 151–158, (2000) (no month avail.).

Ishikawa et al., "Vapor–Treatment of Copper Surface Using Organic Acids," *Materials Researching Society*, Spring 2003 Meeting, Symposium E, Session E, Paper E3.28 (no month avail.).

Addison, C. C. et al., "The Vapour Pressure of Anhydrous Copper Nitrate, and its Molecular Weight in the Vapour State," *J. Chem. Soc.*, pp. 3099–3106 (1958), no month avail.

Akerman, J. J. et al., "Identifying Tunneling in Ferromagnetic–Insulator–Ferromagnetic Thin Film Structures," World–wide web, physics.ucsd.eduiksgrp/Tunneling.html, pp. 1–6, no date avail.

Bobo, J. F. et al., "Spin–dependent tunneling junctions with hard magnetic layer pinning," *Journal of Applied Physics*, vol. 83, No. 11, pp. 6685–6687 (1998), no month avail.

Daughton, J. M., World–wide web nve.com/otherbiz/mram2.pdf, "Advanced MRAM Concepts," pp. 1–6 (Feb. 7, 2001).

Fereday, R. J. et al., "Anhydrous Cobalt (III) Nitrate," *Chemical Communications*, p. 271 (1968), no month avail.

Hsaio, R., "Fabrication of magnetic recording heads and dry etching of head materials" IBM Journal of Research and Development, vol. 43, (1/2):1999: pp. 89–102, no month avail.

Imai, Takuji, World–wide web nikkeibp.asiabiztech.com/nea/200008/tech_108675.html, "100 Gbit/Inch HDD Just Around the Corner," pp. 1–6 (Aug. 2000).

Nilsen, O. et al., "Thin film deposition of lanthanum manganite perovskite by the ALE process," *Journal of materials Chemistry*, vol. 9, pp. 1781–1784 (1999), no month avail.

Pakrad, C. D., "Pure Tech: Growth of MR/GMR Head Materials," World–wide web, puretechinc.com/tech_papers/tech_papers–4.htm, pp. 1–2 (1999), no month avail.

Riihela et al., "Low Temperature Deposition of AlN Films by an Alternate Syppy of Trimethyl Aluminum and Ammonia" Chemical Vapor Deposition, 2 (6): pp. 277–283 (1996), no month avail.

Suntola, *Handbook of Crystal Growth*, vol. 3, Thin films and epitaxy, Part B: Growth mechanisms and dynamics, Chapter 14, pp. 601–663, Hurle, ed. Elsevier Science B.V. (1994), no month avail.

Wang, Shan X., "Advanced materials for Extremely High Density Magnetic Recording Heads," Department of Materials Science and Engineering, Department of Electrical Engineering, Stanford University, Stanford, CA 94305–4045, presentation, no date avail.

World–wide web megahaus.com/tech/westerndigital/shitepapers/gmr_wp.shtml, "GMR Head Technology: Increased Areal Density and Improved Performance Areal Density," pp. 1–4 (Feb. 2000).

World–wide web semiconductor.net/semiconductor/issues/Issues/1998/feb98/docs/emerging.asp, "GMR Read–Write Heads Yield Data Storage Record," pp. 1–2 (Feb. 1998).

World–wide web stoner.leeds.ac.uk/research/gmr.htm, "Giant Magnetoresistance," pp. 1–6, no date avail.

World–wide web, pc.guide.com/ref/hdd/op/heads/techGMR–c.html, "Giant Magnetoresistive (GMR) Heads," pp. 1–4, no date avail.

METHOD OF DEPOSITING THIN FILMS FOR MAGNETIC HEADS

The present application claims priority under 35 U.S.C. §119(e) to U.S. Provisional Application No. 60/290,503 filed May 11, 2001. In addition, this application is related to pending U.S. application Ser. No. 09/997,396, filed Nov. 28, 2001, which claims priority to U.S. Provisional Application No. 60/250,533, filed Nov. 30, 2000 and is entitled Thin Films for Magnetic Devices.

BACKGROUND OF THE INVENTION

1. Field of the Invention

The present invention relates generally to thin dielectric films in magnetic head structures, and more particularly to the filling process of the read head gaps.

2. Description of the Related Art

Hard disk drives (HDD) are used in many modern devices, including computers, digital cameras, set-top-boxes for storing television programs, laser printers and GPS (global positioning system) devices. HDD's usually consist of 1–22 disks covered with magnetic media and 1–44 magnetic heads. Recording heads, also known as magnetic heads, contain write and read elements. These elements are attached to a suspended slider. The preferred substrate material for the magnetic read heads is aluminum titanium carbide (AlTiC). Silicon, glass ceramics and fine-grained mixtures of $Al_2O_3$ and titanium carbide have also been evaluated by the magnetic head industry. Aluminum oxide is used for the insulation of the read element within a magnetic head.

The operating principle of modern magnetic heads is based on the magnetoresistive (MR) and giant magnetoresistive (GMR) effect. Area storage densities of 30–40 gigabits/square inch have been demonstrated, and the read element dimensions have been scaled down. The obtainable area recording density is affected by the track density and linear density. When the insulator layer thickness defining the magnetic head gap is reduced, the linear recording density increases. Gap layers of the read head are currently becoming thinner down to 30 nm. It is preferred that the gap layers have good dielectric strength, i.e., high breakdown voltages, and smooth surfaces without pinholes. As the area data storage density is further increased above 100 Gbits/square inch in the future, hard disk drive heads based on the laser-enhanced GMR, colossal magnetoresistive (CMR) or tunneling magnetoresistive (TMR) effect will possibly become commercially available. GMR heads are also used as magnetic sensors.

Highly integrated GMR heads have a significant thermal load during operation. As the temperature of the read head increases, the signal-to-noise ratio decreases, and the diffusion and electromigration rates increase, which are all undesirable effects. A good read element dissipates heat to the surroundings as efficiently as possible. Reducing the thickness of the insulator gap film improves the heat dissipation. Another possibility is to use dielectric material that has good heat conductivity. Aluminum oxide and aluminum nitride are examples of commercially available materials for the head gap fill. Mixtures of aluminum oxide and aluminum nitride are also feasible. RF magnetron sputtering has been used for thin film processing at low substrate temperatures. Plasma enhanced chemical vapor deposition (PECVD) has been another choice for the deposition of the dielectric material.

Desirable characteristics for the thin film material in a read head gap include the following:

High DC voltage breakdown ($V_{bd}$) value, e.g., $V_{bd} > 6$ MV/cm.

Low DC leakage current.

Low AC conductivity to enable high-frequency response of the magnetic head.

Continuous film, free of pinholes.

High step coverage, e.g., >80–85%.

Good heat conductivity to dissipate the heat generated by the sensing current.

Low surface roughness $R_a$, e.g., $R_a < 1$ nm.

Good corrosion resistance during magnetic head processing.

Low film thickness variation, e.g., <2% for a film thickness of 20 nm.

Good film adhesion.

Controllable residual stress.

Good mechanical strength against wear.

Good compatibility between the head gap fill material and the magnetic head materials, e.g., metals in a spin valve stack.

Exemplary materials in a giant magnetoresistive (GMR) read sensor and exemplary thicknesses include tantalum (Ta, typical layer thickness 3 nm), nickel-iron (NiFe, also known as permalloy, 4–6 nm), copper (Cu, 2–3 nm), cobalt (Co, 0.5 nm), cobalt-platinum-chromium (CoPtCr) and iron-manganese (FeMn). Magnetic shields can be made of NiFe-based materials. NiFe is a ferromagnetic layer that has "soft" magnetic behavior and serves as the sensing layer. Co has high spin-dependent electron scattering, and it increases the magnetoresistance ratio of the read sensor. Cu is a non-magnetic spacer layer that has a good match of its conduction band with the spin-up channel of the ferromagnetic layer. Other possible non-magnetic spacer materials are silver (Ag) and gold (Au). FeMn is an antiferromagnetic layer that pins the "hard" (i.e., requiring very high magnetic fields to reorient) ferromagnetic layer CoPtCr. Other possible antiferromagnetic materials are terbium-cobalt (TbCo, which is actually a compensated ferrimagnet), and certain metal oxides, such as NiO, NiCoO and multilayered NiO/CoO. Ta is used as a seed layer at the bottom of the GMR stack (e.g., on a silicon surface) and as a cover layer on top of the FeMn layer. Examples of other possible seed layer materials are niobium (Nb), titanium (Ti) and zirconium (Zr). Thin film layer thicknesses in the spin valve are on the order of or smaller than the mean free path of the conduction electrons.

The magnetization of a bit on a magnetic medium (e.g., harddisk) affects the magnetic orientation of the sensing layer in the read head because the sensing layer has low coercive force. Low coercive force means that the magnetic orientation of the film can easily be flipped with a small external magnetic field, caused, e.g., by a magnetic bit on the magnetic medium. The pinned layer of the read head has high coercive force and it maintains its magnetic orientation in the magnetic field caused by a magnetic bit on the magnetic medium. A current is forced through the multilayer film stack. Depending on the magnetic orientation of the sensing layer, the read head has a different resistance. When the magnetic orientations of the sensing layer and the pinned layer are parallel, electron scattering in the read sensor is small and the read head has low resistance. When the magnetic orientations of the sensing layer and the pinned layer are antiparallel, electrons scatter a lot in the read sensor, and the read head has high resistance. Resistance changes are converted into voltage changes. When the magnetic orientations of the ferromagnetic sensing layer and pinned layer are forced to either parallel or antiparallel positions, the detection capability of the read head is at a maximum. There is a thin copper spacer to allow weak coupling between the two magnetic layers. The read head generally comprises an air-bearing surface.

Another type of magnetic read head is based on a tunneling structure. In a tunneling magnetoresistive (TMR) read head, two magnetic layers are separated by an insulating film, e.g., four molecular layers of $Al_2O_3$, to allow tunneling of electrons. This insulating layer is called a tunneling layer. The magnitude of tunneling current depends on the relative magnetic orientation of the hardened soft magnetic layers near the tunneling layer. When the magnetic orientations of the magnetic layers are antiparallel, the spins of the electrons do not match, and the tunneling structure has high resistance. When the magnetic orientations of the magnetic layers are parallel, the spins of the electrons match and the tunneling structure has low resistance.

The fabrication of magnetic heads has been described by R. Hsiao in IBM *Journal of Research & Development*, vol. 43, No. ½—Plasma processing, "Fabrication of magnetic recording heads and dry etching of head materials", which is incorporated by reference herein.

Kotaro Yamamoto has described the manufacturing of spin-valve read heads in U.S. Pat. No. 6,128,160, priority date Jun. 30, 1997 and issued Oct. 3, 2000. In this patent, sputtering is used for the deposition of thin films. There are two insulator layers made of sputtered $Al_2O_3$.

The disadvantage of K. Yamamoto's method is that sputtering tends to produce pinholes in the $Al_2O_3$ film, thus lowering the breakdown voltage of the insulator. Another disadvantage of this method is that the step coverage of a sputtered $Al_2O_3$ layer on an uneven surface is far below 100%.

Masamichi Saito et al. have described a magnetoresistive sensor and head in U.S. Pat. No. 6,153,062 ("the '062 patent"), priority date Sep. 7, 1997 and issued Nov. 28, 2000. DC magnetron sputtering and RF sputtering were used for the deposition of the thin films. FIG. 1 of the '062 patent illustrates a dual sensor structure. There is a silicon substrate 2. A first shielding layer 4 having high permeability, e.g., NiFe alloy, is deposited on the substrate. A first gap insulator layer 6 consisting of about 30 nm of $Al_2O_3$ is deposited on the NiFe surface. A seed layer 8 (3 nm Ta) is deposited over the $Al_2O_3$. Then the spin valve is formed over the seed layer 8, including a free magnetic layer 10 (4 nm NiFe), a non-magnetic conductive layer 12 (2.5 nm Cu), a pinned layer 14 (4 nm NiFe), an antiferromagnetic layer 16 (20 nm PtMn alloy), another pinned layer 18 (4 nm NiFe), another non-magnetic conductive layer 20 (2.5 nm Cu) and another free magnetic layer 22 (4 nm NiFe). Finally a top layer 24 (3 nm Ta) is deposited. The structure is masked, patterned and etched. Then the deposition is continued with hard bias layers 26 (30 nm CoPt alloy) and electrically conductive layers 28 (W or Cu). The role of the hard bias layer is to prevent the formation of a plurality of magnetic domains in the sensing layer. A second gap insulator layer 30 (30 nm $Al_2O_3$) is deposited on a surface that consists of Ta and W or Cu surfaces. A second shield layer 32 (e.g., NiFe alloy) is deposited on the second head gap layer 30. The magnetic gap length is determined by the distance between the first and the second shield layers. The magnetic gap length can be decreased if the first and the second head gap insulator layers 6 and 30 can be made thinner.

The method in U.S. Pat. No. 6,153,062 disadvantageously results in pinholes in the $Al_2O_3$ film that lower the breakdown voltage of the insulator and in poor step coverage of $Al_2O_3$ on the uneven surface.

SUMMARY OF THE INVENTION

A structure and method of fabricating a magnetic read head, comprising forming a fill layer for a magnetic read head gap using atomic layer deposition (ALD), is disclosed. The fill layer comprises an insulator, preferably aluminum oxide, aluminum nitride, mixtures thereof and layered structures thereof. The thickness of the ALD-formed head gap fill layer preferably is between approximately 5 nm and 100 nm, more preferably between approximately 10 nm and 40 nm.

Alternatively, the gap fill material comprises an ALD-formed layered structure of aluminum oxide and a compound with high thermal conductivity, such as beryllium oxide or boron nitride.

The magnetic read head comprises a magnetic sensing element such as a GMR (giant magnetoresistive), CMR (colossal magnetoresistive) or TMR (tunneling magnetoresistive) sensor.

DETAILED DESCRIPTION OF THE PREFERRED EMBODIMENT

Figure 1:
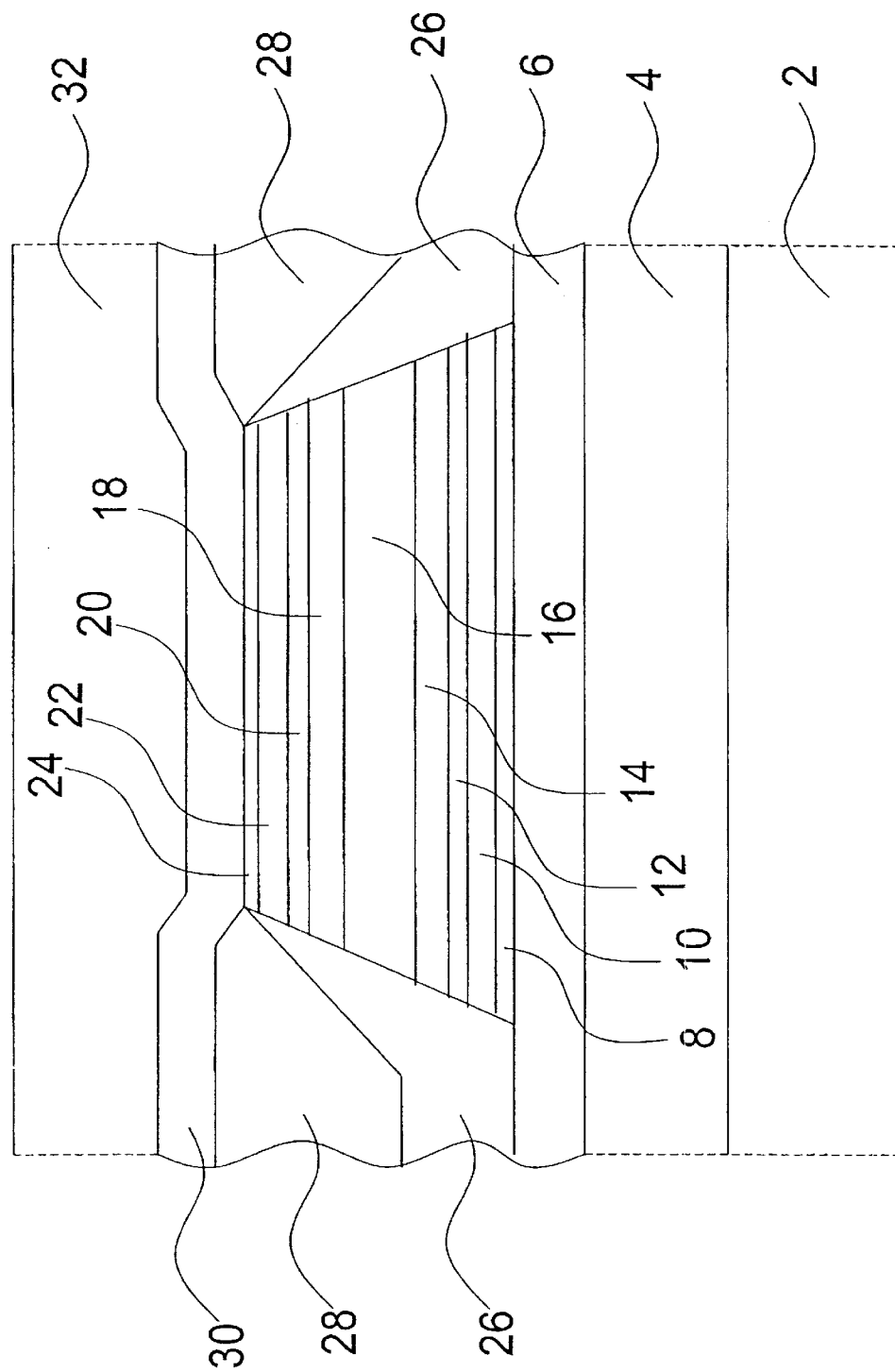
FIG. 1 shows a schematic drawing of a symmetric dual read sensor sandwiched between two head gap fill layers, constructed in accordance with a preferred embodiment of the present invention.

Although the embodiment in FIG. 1 is illustrated for a magnetic read sensor based on the giant magnetoresistive (GMR) effect, the teachings herein can be applied equally well to magnetic read sensors based on the colossal magnetoresistive effect (CMR) or the tunneling magnetoresistive effect (TMR).

FIG. 1, constructed in accordance with a preferred embodiment of the present invention, illustrates a dual read sensor structure similar to that of U.S. Pat. No. 6,153,062, the disclosure of which is incorporated herein by reference for purposes of further describing the overall device structure and component functions, as well as alternative materials for certain layers. The structure includes a substrate 2 (e.g., silicon or AlTiC), a high permeability first shielding layer 4 (e.g., 1–4 µm of NiFe) and a first gap insulator layer 6 (e.g., 30 nm of $Al_2O_3$). A barrier/seed layer 8 (e.g., 3 nm Ta) has been deposited on the first gap layer 6, followed in sequence by the deposition of a free magnetic layer 10 (e.g., 4 nm NiFe), a non-magnetic electrically conductive layer 12 (e.g., 2.5 nm Cu), a pinned layer 14 (e.g., 4 nm NiFe), an antiferromagnetic layer 16 (e.g., 20 nm PtMn alloy), a second pinned layer 18 (e.g., 4 nm NiFe), a second non-magnetic electrically conductive layer 20 (e.g., 2.5 nm Cu), a second free magnetic layer 22 (e.g., 4 nm NiFe) and a barrier layer 24 (e.g., 3 nm Ta). Hard bias layers 26 (e.g., CoPt) and electrically conductive electrode layers 28 (e.g., W or Cu) surround the structure. A second gap insulator layer 30 (e.g., 30 nm $Al_2O_3$) is then deposited, followed by the formation of the second high permeability shielding layer 32 (e.g., 1–4 µm of NiFe).

The thickness of the exemplary gap layers 6, 30 has been given as 30 nm. Preferably the gap layers are between 5 nm and 100 nm in thickness, more preferably between 10 nm and 40 nm in thickness.

ALD-formed aluminum oxide ($Al_2O_3$) for the gap fill layer has several advantages over the existing deposition technologies. ALD-formed $Al_2O_3$ films show narrow DC breakdown voltage distributions, high DC breakdown voltage, smooth thin film surface, excellent step coverage, accurately controlled thin film thickness, and uniform thin film thickness over the substrate. The ALD method has produced high-quality $Al_2O_3$ thin films for magnetic head gap fill at a deposition temperature of 200° C. without plasma. Because the ALD process coats the whole surface quickly with an impervious film, sensitive substrate materials are not damaged during the thin film deposition.

Alternatively, the head gap fill layer can comprise aluminum oxide, aluminum nitride, aluminum oxide/aluminum nitride nanolaminates or sandwiches and mixtures thereof.

A thorough description of ALD processing can be found in "Atomic Layer Epitaxy", Part B: Growth Mechanisms and Dynamics, Chapter 14, pp. 601–663, edited by D. T. J. Hurle, Elsevier Science B. V., 1994, the disclosure of which is incorporated herein by reference.

The Aluminum Oxide and/or Nitride Formation Process

According to one preferred embodiment, vapor-phase pulses of an aluminum source chemical and an oxygen source chemical are fed alternately into a reaction chamber that has controlled pressure and temperature. An aluminum oxide and/or nitride thin film forms via self-saturating surface reactions on the surface of a heated substrate in the reaction chamber. During the thin film deposition, the pressure of the reaction chamber is usually below atmospheric pressure, preferably about 0.1–50 mbar, more preferably 1–20 mbar. The source chemical pulses are preferably separated from each other with flowing inactive gas, such as inert or noble gas, so that gas phase reactions are avoided and only self-saturating surface reactions are enabled. The substrate is desirably maintained above the condensation temperatures and below the thermal decomposition temperatures of the source chemicals.

The Source Materials

1. Aluminum Source Materials

The aluminum source chemical is selected from a group of aluminum compounds that are volatile at the source temperature and thermally stable at the substrate temperature.

1.1 Alkyl Aluminum Compounds

Alkyl aluminum compounds have at least one aluminum-carbon bond. Examples of source compounds are trimethylaluminum $(CH_3)_3Al$, triethylaluminum $(CH_3CH_2)_3Al$, tri-n-butylaluminum $(n-C_4H_9)_3Al$, diisobutylaluminum hydride $(i-C_4H_9)_2AlH$, diethylaluminum ethoxide $(C_2H_5)_2AlOC_2H_5$, ethylaluminum dichloride $(C_2H_5)_2AlCl_2$, ethylaluminum sesquichloride $(C_2H_5)_3Al_2Cl_3$, diisobutylaluminum chloride $(i-C_4H_9)_2AlCl$ and diethylaluminum iodide $(C_2H_5)_2AlI$. These compounds are commercially available from, e.g., Albemarle Corporation, Baton Rouge, La., USA.

1.2 Aluminum Alkoxides (Al—O—C Bond)

Aluminum alkoxides contain an aluminum-oxygen-carbon (Al—O—C) bond. Examples of volatile source compounds are aluminum ethoxide $Al(OC_2H_5)_3$, aluminum isopropoxide $Al[OCH(CH_3)_2]_3$ and aluminum s-butoxide $Al(OC_4H_9)_3$. These compounds are commercially available from, e.g., Strem Chemicals, Inc., Newburyport, Mass., USA.

1.3 Aluminum Beta-diketonates

Aluminum beta-diketonates have organic ligands coordinated to aluminum via oxygen atoms. Examples of source compounds are aluminum acetylacetonate $Al(CH_3COCHCOCH_3)_3$, often shortened as $Al(acac)_3$, and tris-(2,2,6,6-tetramethyl-3,5-heptanedionato)aluminum, often shortened as $Al(thd)_3$, $Al(TMHD)_3$ or $Al(DPM)_3$. Volatile halogenated aluminum beta-diketonates are also commercially available, such as aluminum hexafluoroacetylacetonate $Al(CF_3COCHCOCF_3)_3$, often shortened as $Al(hfac)_3$. These compounds are commercially available from, e.g., Strem Chemicals, Inc., Newburyport, Mass., USA.

1.4 Aluminum Halides

Inorganic aluminum halides such as aluminum chloride $AlCl_3$ or $Al_2Cl_6$, aluminum bromide $AlBr_3$, and aluminum iodide $AlI_3$ have sufficient vapor pressure at suitable source temperatures and they may be used as precursors.

1.5 Anhydrous Aluminum Nitrate

Aluminum nitrate that is normally sold commercially contains crystalline water. That kind of aluminum nitrate is not volatile at all. Aluminum nitrate to be used for ALD processes is desirably anhydrous. The synthesis of anhydrous $Al(NO_3)_3$ has been described by G. N. Shirokova, S. Ya. Zhuk and V. Ya. Rosolovskii in Russian Journal of Inorganic Chemistry, vol. 21, 1976, pp. 799–802, the disclosure of which is incorporated herein by reference. The aluminum nitrate molecules on the substrate surface break into aluminum oxide when they are contacted with organic compounds, such as ethers.

1.6 Trialkylsilylamide Compounds of Aluminum

As an example, bis(trimethylsilyl)amide $[(CH_3)_3Si]_2N$ ligand bound to aluminum makes the aluminum compound volatile.

2. Oxygen Source Materials

The oxygen source material is selected from a group of volatile or gaseous compounds that contain oxygen and are capable of reacting with an adsorbed portion of the selected aluminum source compound on the substrate surface at the deposition conditions, resulting in the deposition of an aluminum oxide thin film on the substrate surface.

For the deposition of an aluminum oxide thin film for a magnetic head gap fill the oxygen source is preferably selected from the following materials:

water $H_2O$;

hydrogen peroxide $H_2O_2$;

primary alcohols, such as methanol $CH_3OH$ and ethanol $C_2H_5OH$;

secondary alcohols, such as isopropanol $CH_3CHOHCH_3$;

tertiary alcohols, such as tert-butanol $(CH_3)_3COH$;

oxygen $O_2$;

ozone $O_3$; and oxygen with unpaired electrons.

When trimethyl aluminum $(CH_3)_3Al$ is chosen as the aluminum source chemical, water is preferably used as the oxygen source chemical in the ALD process, resulting in the deposition of an $Al_2O_3$ thin film.

3. Nitrogen Source Materials

Preferably, the nitrogen compound is selected from the group comprising:

ammonia ($NH_3$);

hydrogen azide ($HN_3$) and alkyl derivatives of this compound, such as $CH_3N_3$;

hydrazine ($N_2H_4$) and alkyl derivatives of this compound, such as dimethyl hydrazine;

hydroxyl amine ($NH_2OH$);

amines, preferably primary, secondary and tertiary amines, such as methylamine, diethylamine and triethylamine;

nitrogen radicals such as $NH_2^e$, $NH^{ee}$ and $N^{eee}$, wherein $^e$ represents a free electron capable of bonding; and excited state of nitrogen (N$_2$*).

Hydroxyl amine may also form a mixture of aluminum oxide and aluminum nitride. When the insulator deposition is started with a thin aluminum oxide layer, the substrate materials are protected against aggressive nitrogen source chemicals such that nitrogen and ammonia radicals can be used for the deposition of an aluminum nitride layer on top of the Al$_2$O$_3$ layer.

ALD Reactors

An ALD reactor module can be employed in a cluster tool for processing single substrates. A substrate arrives from a previous cluster module, Al$_2$O$_3$ is deposited by ALD and then the substrate is transported to the next process module in the cluster platform or unloaded from the cluster platform. Head gap fill films are deposited by ALD, and spin valve layers are formed, e.g., by sputtering or pulsed laser deposition. Because ALD coats the substrate surface with a uniform, pinhole-free insulator film, all the sensitive materials below the insulator layer are protected against the surrounding gas atmosphere. After head gap fill, the substrate can be transported to the next process step through a non-inert atmosphere. Before the head gap fill, there may be a sensitive material surface exposed to the surrounding atmosphere, and the substrate transportation is preferably done under high vacuum or inert gas atmosphere.

The ALD method can be used for the deposition of the head gap fill film in a batch reactor as well. Several tens of substrates can be coated with the insulator film in one run. The loading of the read head substrates into the ALD batch reactor is somewhat complicated in order to avoid oxidation of the metal layers on the substrates. Preferably, a surrounding inert atmosphere is used during the loading.

The Chemistry

ALD of Aluminum Oxide

The substrate surface contains hydroxyl (—OH) groups that act as reactive sites during the aluminum source chemical pulse. The aluminum source molecule releases one of its ligands every time the aluminum source molecule in the gas phase reacts with a surface —OH group. Each chemisorbed aluminum compound molecule (e.g., Al(CH$_3$)$_2$ or >AlCH$_3$) has 1–2 ligands left that are pointing away from the substrate surface. The symbol ">" indicates that aluminum forms two single bonds with unspecified surrounding atoms. The ligands prevent further adsorption after the reaction sites are saturated, such that no more than one monolayer forms per pulse.

After removal of the aluminum source chemical (e.g., by purging), in the next reactant pulse oxygen source chemical molecules (e.g., H$_2$O) react with these ligands (e.g., —CH$_3$) on the surface, release the ligands as neutral molecules (e.g., methane CH$_4$) and preferably leave some —OH groups on the surface. Another possibility is that, instead of OH—groups attached to aluminum atoms on the surface, an oxygen bridge (>Al—O—Al<) is formed between two aluminum atoms on the surface. Alkyl ligands react with water to form alkane molecules, alkoxide ligands react to form alcohol molecules, etc. Strong oxidizing molecules may burn the organic ligands on the surface to form water and CO$_2$ molecules that leave the surface and the reaction chamber.

Each pulsing cycle, including aluminum source pulse, first purge, oxygen source pulse and second purge, leave up to one molecular layer of aluminum oxide on the substrate. Depending on the size of the aluminum source molecules chemisorbed on the surface, the thickness increase of the Al$_2$O$_3$ can be less than one molecular layer of Al$_2$O$_3$/pulsing cycle on average. When using TMA and H$_2$O as source chemicals, a typical deposition rate for Al$_2$O$_3$ is near 1 Å/pulsing cycle on average. The net reaction is as follows:

$$2(CH_3)_3Al(g)+3H_2O(g)\rightarrow Al_2O_3(s)+6CH_4(g).$$

EXAMPLES

Example 1

Magnetic Head Gap Fill with ALD-formed Aluminum Oxide

A substrate with a shielding layer (NiFe alloy) on top was loaded into the reaction chamber of an ALD reactor. The transportation of the substrate was done in an inert atmosphere to avoid excessive oxidation of the NiFe surface. The reaction chamber was evacuated with a mechanical vacuum pump connected to the exhaust line of the reactor. While the pumping line was kept open and the vacuum pump was on, the pressure of the reaction chamber was adjusted to about 10 mbar with flowing nitrogen gas. The flow rate of the nitrogen gas to the reaction chamber was set to 300 std. cm$^3$/minute (sccm) with a mass flow controller that was supervised with an external computer. Then the reaction chamber holding the substrate was heated to 200° C. More generally, the substrate is maintained at temperatures high enough to avoid condensation and low enough to avoid thermal decomposition of the reactants. After the temperature had stabilized, the source chemical pulsing was started with an external PC computer that had a deposition program running.

(CH$_3$)$_3$Al, also known as TMA, and water were evaporated from external source bottles kept at room temperature. The evaporated source chemicals were introduced alternately in a pulsed manner to the reaction chamber where they were contacted with the substrate surface. After each source chemical pulse, the surplus reactant and reaction byproducts were removed from the reaction chamber with flowing nitrogen gas that was pumped away with the vacuum pump. Aluminum oxide thin film grew on the substrate surface, layer by layer. Due to the bulkiness of the TMA molecules and the number of reactive sites on the substrate surface, the deposition rate of the film was near 1 Å/pulsing cycle. This constitutes less than one monolayer of Al$_2$O$_3$ per pulsing cycle. The deposition of the film proceeded uniformly according to the principles of ALD until the film thickness had reached 20 nm after 200 pulsing cycles. In this experimental case, the reaction chamber was cooled to below 100° C. before removing the substrate from the reaction chamber. In production reactors, the reaction chamber is typically kept at a constant temperature all the time because the substrate is transported via a load lock chamber.

The Al$_2$O$_3$ thin film on the substrate had very good uniformity; the thickness variation was below 2%. Amorphous Al$_2$O$_3$ had a smooth surface and a sufficient DC voltage breakdown value for magnetic head applications. ALD-formed Al$_2$O$_3$ thin films had higher DC breakdown voltage than aluminum oxide reference samples made with standard industrial CVD (chemical vapor deposition) and PVD (physical vapor deposition) processes.

The breakdown voltage distribution (the number of broken samples at specified voltages) was narrow in the ALD-formed aluminum oxide samples, probably because of the uniformity of the pinhole-free film. Step coverage of the ALD-formed samples was essentially near 100%, which is a clear improvement over the current industrial aluminum oxide deposition processes. CVD and PVD processes have shown about 70%–80% step coverage for the head gap fill with aluminum oxide. Thus, ALD-formed aluminum oxide thin films have improved the dielectric strength and the step coverage of the magnetic head gap fill.

The aluminum oxide film can be deposited at 150–350° C. in ALD mode with the source chemicals used in Example 1. Due to the thermal sensitivity of the read head materials, the substrate temperature was kept at or below 200° C. The process pressure is not restricted to the 10 mbar value used in Example 1. Lower or higher pressures can be used in the reaction chamber as long as the purging or other removal technique is conducted carefully to prevent overlapping of source chemical pulses in the gas phase of the reaction chamber.

Example 2

Manufacturing of Read Heads with ALD-formed $Al_2O_3$

According to the preferred embodiments, ALD is used for the deposition of the $Al_2O_3$ layers instead of sputtering. An AlTiC substrate is provided to a sputtering chamber in a cluster tool having a sputtering module and an ALD module. A shield consisting of 1–4 μm of NiFe is sputtered on the substrate. Then on the order of 30 nm of $Al_2O_3$ is deposited by ALD at 200° C. from alternate pulses of TMA and $H_2O$ on the NiFe surface to form the first gap insulator. About 2–10 nm CoFe, 2–10 nm of Cu, 2–10 nm of CoFe and 2–10 nm of FeMn are sputtered on the $Al_2O_3$ surface to form a spin valve. Then the substrate is transported away from the cluster tool for depositing and patterning a mask. CoPt and Ti,Cr layers are deposited on the sides of the spin valve. A mask is formed on Ti,Cr areas that will be plated with Ti to form a contact. Then the second $Al_2O_3$ insulator is deposited by ALD at 200° C. from alternate pulses of TMA and $H_2O$ on a surface that consists of Ti,Cr, FeMn and mask materials. ALD provides a pinhole-free, uniform insulator film on a contoured surface at a low deposition temperature.

Example 3

Magnetic Head Gap Fill with ALD-formed Aluminum Nitride

AlN thin films can be formed from alternate pulses of $(CH_3)_3Al$ and $NH_3$. The deposition of AlN has been described by Diana Riihelä et al. in Chemical Vapor Deposition, 2 (1996), No. 6, pp. 277–283, the disclosure of which is incorporated by reference herein. When using ammonia the lowest practical substrate temperature was about 325° C.

According to one embodiment of the present invention, replacing $NH_3$ with more reactive nitrogen species such as hydrazine $N_2H_4$, radicals $NH_2^e$, $NH^{ee}$, $N^{eee}$ and excited state of nitrogen $N_2^*$ makes it possible to lower the AlN deposition temperature for the head gap fill. Radicals are generated, e.g., according to the method disclosed by Arthur Sherman in U.S. Pat. No. 5,916,365, filed Aug. 16, 1996 and issued Jun. 29, 1999. In order to convert methyl (—$CH_3$) groups in TMA into methane ($CH_4$) molecules, it can be advantageous to introduce hydrogen gas to the reaction chamber during the nitrogen radical or excited state nitrogen pulse because the nitrogen species is short of hydrogen. Excited state of nitrogen $N_2^*$ is created by passing an electric discharge through $N_2$ gas at 0.1–2 Torr followed by the recombination of ground state $N(^4S)$ atoms into $N_2^*$ (N. N. Greenwood et al., Chemistry of the Elements, Pergamon Press Ltd., first edition, 1984, p. 474). When a highly reactive nitrogen species is available as the nitrogen source, the choice of the aluminum source chemical is not limited to alkyl aluminum compounds; other volatile aluminum compounds can be used as well.

Example 4

Magnetic Head Gap Fill with ALD-formed Multilayer Insulator

According to another embodiment of the present invention, the head gap fill is conducted with two different materials so that the resulting insulator film comprises $Al_2O_3$ and AlN layers on top of each other. The film is started with atomic layer deposition of $Al_2O_3$, continued with ALD of AlN and finished with ALD of $Al_2O_3$. This is a sandwich structure that encapsulates AlN with $Al_2O_3$ to enable high dielectric strength and high thermal conductivity.

According to still another embodiment of the present invention, the head gap fill consists of a nanolaminate made of several thin film layers of $Al_2O_3$ and AlN. AlN is more prone to crystallite growth than amorphous $Al_2O_3$, so it is advantageous to interrupt the AlN crystallite growth with $Al_2O_3$ layers.

Diana Riihelä et al. noted in Chemical Vapor Deposition, 2 (1996), No. 6, pp. 277–283 that the surface of the aluminum nitride is easily converted into aluminum oxide due to the moisture in the surrounding gas atmosphere such as room air.

According to still another embodiment of the present invention, the $Al_2O_3$ layer is formed on AlN as follows. An oxygen source chemical, such as $H_2O$, is pulsed onto the AlN surface. $H_2O$ molecules convert the AlN surface into $Al_2O_3$ and $NH_3$ reaction byproduct molecules are purged away while beneath the surface there is AlN after the surface treatment with the oxygen source chemical. The reaction chamber is carefully purged with inert gas to remove the residual oxygen source chemical, and then the deposition is continued with atomic layer deposition of AlN. AlN is rather sensitive to any $H_2O$ impurity present in inert purging gas (e.g., $N_2$) and in ammonia. Thus, $NH_3$ preferably has a purity of at least 99.999% (5.0) and $N_2$ preferably has at least a purity of 99.9999% (6.0).

Although AlN may lose some thermal conductivity when the AlN layer is made very thin, according to one embodiment of the present invention, the head gap fill can also comprise atomic layer deposition of an $Al_xO_yN_z$ thin film. In this method, an oxygen source chemical is replaced with a nitrogen source chemical and back to an oxygen source chemical so frequently that the resulting thin film can be considered a uniform amorphous $Al_xO_yN_z$, and separate $Al_2O_3$ and AlN phases cannot be detected.

Because ALD-formed $Al_2O_3$ can have higher dielectric breakdown voltage than is needed for the head fill application, the properties of the head fill can be optimized by replacing some $Al_2O_3$ in the thin film with a compound that has high thermal conductivity but limited dielectric strength, such as beryllium oxide BeO and/or boron nitride BN. Such replacement can be effected by the same techniques described above with respect to alternating cycles of $Al_2O_3$ and AlN, resulting in mixed phases (when substitutions are performed frequently) or distinct layers.

Hence, although the foregoing description of the preferred embodiment of the present invention has shown, described and pointed out the fundamental novel features of the invention, it will be understood that various omissions, substitutions and changes in the form of the detail of the method and structure as described, as well as the uses thereof may be made by those skilled in the art, without departing from the spirit of the present invention. Consequently, the scope of the present invention should not be limited to the foregoing discussion, but should be defined by reference to the appended claims.

We claim:

1. A method of fabricating a magnetic read head, comprising forming a fill layer for a magnetic read head gap using atomic layer deposition (ALD).

2. The method of claim 1 wherein the fill layer comprises an insulator.

3. The method of claim 1 wherein the fill layer comprises aluminum oxide.

4. The method of claim 3 wherein the aluminum oxide is deposited at a temperature between about 150° C. and 350° C.

5. The method of claim 4 wherein the aluminum oxide is deposited at a temperature less than or equal to about 200° C.

6. The method of claim 1 wherein the fill layer comprises aluminum nitride.

7. The method of claim 1 wherein the fill layer comprises an aluminum oxide/aluminum nitride nanolaminate.

8. The method of claim 1 wherein the fill layer comprises a sandwich structure of aluminum oxide/aluminum nitride/aluminum oxide.

9. The method of claim 1 wherein aluminum source chemicals comprise aluminum compounds that are volatile at the source temperature and thermally stable at the substrate temperature.

10. The method of claim 1 wherein aluminum source chemicals for the ALD deposition of the fill layer for a magnetic read head gap are selected from the group consisting of alkyl aluminum compounds, aluminum alkoxides, aluminum beta-diketonates, aluminum halides, anhydrous aluminum nitrate and trialkylsilylamide compounds of aluminum.

11. The method of claim 1 wherein oxygen source chemicals for the ALD deposition of the fill layer for a magnetic read head gap are selected from the group consisting of water, hydrogen peroxide, primary alcohols, secondary alcohols, tertiary alcohols, oxygen, ozone and oxygen with unpaired electrons.

12. The method of claim 1 wherein nitrogen source chemicals for the ALD deposition of the fill layer for a magnetic read head gap are selected from the group consisting of ammonia, hydrogen azide and its alkyl derivatives, hydrazine and its alkyl derivatives, hydroxyl amine, amines, nitrogen radicals and excited nitrogen species.

13. The method of claim 1 wherein the fill layer is deposited over a magnetic shield layer.

14. The method of claim 13 wherein the magnetic shield layer comprises nickel-iron.

15. The method of claim 1 wherein the fill layer is deposited over a barrier layer.

16. The method of claim 15 wherein the barrier layer comprises tantalum.

* * * * *

UNITED STATES PATENT AND TRADEMARK OFFICE
CERTIFICATE OF CORRECTION

PATENT NO.        : 6,759,081 B2                                           Page 1 of 1
APPLICATION NO.   : 10/136095
DATED             : July 6, 2004
INVENTOR(S)       : Juha Hujanen et al.

It is certified that error appears in the above-identified patent and that said Letters Patent is hereby corrected as shown below:

On the Title page, in Item 12, please delete "Huganen" and insert --Hujanen--, therefor.

On the Title page, in Item 75, please delete "Huganen" and insert --Hujanen--, therefor.

Signed and Sealed this

Twenty-fourth Day of October, 2006

JON W. DUDAS
*Director of the United States Patent and Trademark Office*